US007007277B2

(12) United States Patent
Hildebrand et al.

(10) Patent No.: US 7,007,277 B2
(45) Date of Patent: Feb. 28, 2006

(54) PRIORITY RESOURCE ALLOCATION IN PROGRAMMING ENVIRONMENTS

(75) Inventors: Dean Hildebrand, Toronto (CA); Michael G. Polan, Ajax (CA)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 09/804,337

(22) Filed: Mar. 12, 2001

(65) Prior Publication Data
US 2001/0034753 A1 Oct. 25, 2001

(30) Foreign Application Priority Data
Mar. 23, 2000 (CA) .................................. 2302959

(51) Int. Cl.
*G06F 9/00* (2006.01)
(52) U.S. Cl. ..................................................... 718/104
(58) Field of Classification Search ................. 718/104
See application file for complete search history.

(56) References Cited

U.S. PATENT DOCUMENTS

| | | | | |
|---|---|---|---|---|
| 5,754,854 A * | 5/1998 | Kanamori et al. | .......... | 718/104 |
| 6,505,229 B1 * | 1/2003 | Turner et al. | ............... | 718/107 |
| 6,598,068 B1 * | 7/2003 | Clark | .......................... | 718/104 |
| 6,622,155 B1 * | 9/2003 | Haddon et al. | ............. | 718/100 |

* cited by examiner

*Primary Examiner*—Sue Lao
*Assistant Examiner*—Andy Ho
(74) *Attorney, Agent, or Firm*—A. Bruce Clay; Hoffman, Warnick & D'Alessandro LLC

(57) ABSTRACT

An extension to a programming language provides for the fair allocation of resources in the programming language environment. A resource pool data object stores available resource objects. A resource queue stores users waiting for resource object allocation. A method releases resources by placing the resources in the resource pool and by notifying users that a resource object has been released. An acquire resource method provides for users to be placed on the resource queue when there are no available resource objects. The acquire resource method waits on the availability of the resource object until the user comes to the head of the resource queue and a resource object is available, following which the resource object is returned to the user. Alternatively, a time out condition is reached once a predefined wait limit is met. The synchronization between methods and users waiting on resources is provided by the acquisition and release of a common lock.

14 Claims, 2 Drawing Sheets

PRIORITY RESOURCE ALLOCATION IN PROGRAMMING ENVIRONMENTS

FIELD OF THE INVENTION

The present invention is directed to an improvement in computing systems and in particular to resource allocation in programming language environments.

BACKGROUND OF THE INVENTION

Certain computer programming languages, such as the Java programming language, make it possible for different threads (or processes) to request access to resources available in the run time environment. For example, access to a socket for TCP/IP communication may be requested by different Java language threads running concurrently on a particular computer system. Where a particular resource is limited due to the constraints of the computer system (such as memory constraints, speed constraints and so forth), it may be necessary for certain threads seeking the resource to suspend operation until the resource is available. Different processes or threads contending for a limited or fixed number of resources is a problem commonly encountered in computing systems and, in particular, in computing environments such as the Java environment where different threads are executed concurrently.

For example, in the Java language, the Object.wait( ) method is provided to permit a thread to wait on the availability of the object resource. The availability of the object resource is signalled by a thread calling the Java-standard Object.notify( ) (or Object.notifyAll( )) method. In the terminology of the prior art, the thread which owns the lock on the object resource awakens the waiting thread by calling the Object.notify( ) method.

Using this approach to resource allocation in programming languages such as Java may create unfair access to resources in the programming environment and may result in access to resources being inappropriately denied in some cases. It is possible for multiple threads to be waiting on the resource, or seeking access to the resource for the first time. Any awakened thread will compete with any other threads that are actively seeking to synchronize on the object. In the Java environment, for example, there is no built in method to ensure that a thread which has been waiting for a longer time to have access to the resource will obtain that access prior to a thread which has been waiting for a shorter period of time. In fact, where there is a high level of contention for a particular resource, it is possible for a thread to repeatedly fail to obtain access to the resource and to be completely unable to lock the object.

In prior art computer systems, allocation of resources to processes or threads is carried out using queues. For example, in U.S. Pat. No. 5,752,031, Cutler et al., queue objects are used to ensure that the number of active threads are below a defined level to provide optimized concurrency. In U.S. Pat. No. 5,003,464, Ely et al., a queue is used to determine which processor in a multi-processor environment will be provided with a coordinator function. In U.S. Pat. No. 5,006,983, Wayne et al., queues are used to allocate service resources to a plurality of individuals requesting services. However, these prior art approaches do not operate within a programming language environment to provide a simple means for ensuring that resource allocation as implemented in that programming language may be carried out in a fair manner.

It is, therefore, desirable to have a means to extend programming languages, such as the Java programming language, to permit the allocation of resources to be carried out in a manner giving priority to those threads which have waited longest for access to the resource.

SUMMARY OF THE INVENTION

According to one aspect of the present invention, there is provided a means to permit priority access to resources in programming language environments.

According to another aspect of the invention, there is provided a language extension to an object oriented programming language for the allocation of resource objects to users, the language extension including, a resource pool for storing available resource objects, a resource queue for storing data representing select ones of the users, the users on the resource queue seeking the allocation of the resource objects, a release resource method for releasing a concluded resource object after use by a user, the release resource method including:

means for returning the concluded resource object to the resource pool, and means for, when the resource queue is empty, using an object oriented programming language notify method to notify the users waiting on a synchronization object that the concluded resource object is available, an acquire resource method for an acquiring user to acquire at least one of the resource objects, the acquire resource method including:

means for the acquire resource method to return at least one of the resource objects in the resource pool if the resource pool is not empty and there are no users on the resource queue, means for, where the resource pool is empty or the resource queue is non-empty, adding the acquiring user to the resource queue, having the acquiring user wait for notification by using the object oriented programming language wait method on the synchronized object, awakening the acquiring user when there is a resource object in the resource pool, determining if the acquiring user is at the head of the resource queue and if the acquiring user is at the head of the resource queue, removing the acquiring user from the resource queue, removing at least one of the resource objects from the resource pool and returning said at least one of the resource objects to the acquiring user, otherwise, continuing to have the acquiring user wait for notification by using the object oriented programming language wait method on the synchronized object, means for the acquire resource method to return a time out exception if the acquiring user does not acquire at least one of the resource objects within a predefined time, each of the release resource method and the acquire resource method including synchronization means to constrain users such that only one user may execute either the release resource method or the acquire resource method at any one time, the said synchronization means being synchronized on the synchronization object.

According to another aspect of the invention, there is provided the above language extension, in which the synchronization object is the resource queue and in which the programming language is Java.

According to another aspect of the invention, there is provided the above language extension in which the acquire resource method includes a helper method including the means to wait for the acquiring user to be at the head of the resource queue and the resource pool to be non-empty.

According to another aspect of the invention, there is provided a method for allocating resource objects to users in a programming language environment, the programming language environment including a resource pool for storing available resource objects, and a resource queue for storing data representing select ones of the users, the users on the resource queue seeking the allocation of the resource objects, the method including the steps of:
   a. releasing a concluded resource object after use by a user, including the steps of:
      i. returning the concluded resource object to the resource pool, and
      ii. when the resource queue is empty, using an object oriented programming language notify method to notify the users waiting on a synchronization object that the concluded resource object is available,
   b. permitting an acquiring user to acquire at least one of the resource objects, including the steps of:
      i. returning to the acquiring user at least one of the resource objects in the resource pool if the resource pool is not empty and there are no users on the resource queue,
      ii. where the resource pool is empty or the resource queue is non-empty, adding the acquiring user to the resource queue, having the acquiring user wait for notification by using the object oriented programming language wait method on the synchronized object,
      awakening the acquiring user when there is a resource object in the resource pool,
      determining if the acquiring user is at the head of the resource queue, and
      if the acquiring user is at the head of the resource queue,
      removing the acquiring user from the resource queue,
      removing at least one of the resource objects from the resource pool and
      returning said at least one of the resource object to the acquiring user,
      otherwise, continuing to have the acquiring user wait for notification by using the object oriented programming language wait method on the synchronized object,
      iii. returning a time out exception if the acquiring user does not acquire at least one of the resource objects within a predefined time, and
   c. synchronizing each of the above steps to constrain users such that only one user may execute either the above steps (a) and (b) at any one time, said synchronization being carried out on the synchronization object.

According to another aspect of the invention, there is provided a program storage device readable by a machine, tangibly embodying a program of instructions executable by the machine to perform the above method steps.

According to another aspect of the invention, there is provided a computer program product for use with a computer supporting the Java programming language environment, the computer program product including a Java class for the allocation of resource objects to threads, the class including,
   a resource pool for storing available resource objects,
   a resource queue for storing data representing select ones of the threads, the threads on the resource queue seeking the allocation of the resource objects,
   a release resource method for releasing a concluded resource object after use by a thread, the release resource method including the steps of:
      returning the concluded resource object to the resource pool, and
      when the resource queue is empty, using the notify method to notify the threads waiting on a synchronization object that the concluded resource object is available,
   an acquire resource method for an acquiring thread to acquire at least one of the resource objects, the acquire resource method including the steps of:
      returning at least one of the resource objects in the resource pool if the resource pool is not empty and there are no threads on the resource queue,
      where the resource pool is empty or the resource queue is non-empty,
      adding the acquiring thread to the resource queue,
      invoking the Java wait method on the synchronized object,
      when the acquiring thread is awakened and there is a resource object in the resource pool, determining if the acquiring thread is at the head of the resource queue, and
      if the acquiring thread is at the head of the resource queue,
      removing the acquiring thread from the resource queue,
      removing at least one of the resource objects from the resource pool and
      returning said at least one of the resource objects to the acquiring user,
      otherwise, invoking the Java wait method on the synchronized object,
      returning a time out exception if the acquiring thread does not acquire at least one of the resource objects within a predefined time,
   each of the release resource method and the acquire resource method using the Java synchronized method to constrain threads such that only one thread may execute either the release resource method or the acquire resource method at any one time, the said synchronization means being synchronized on the synchronization object.

According to another aspect of the invention, there is provided a language extension to a programming language for the allocation of resources to users, the language extension including,
   a resource pool for storing available resources,
   a resource queue for storing data representing select ones of the users, the users on the resource queue seeking the allocation of the resource objects,
   a release resource means for releasing a concluded resource after use by a user, the release resource means including:
      means for returning the concluded resource to the resource pool, and means for, when the resource queue is empty, notifying each user waiting on a predefined synchronization flag that the concluded resource is available, an acquire resource means for an acquiring user to acquire a one of the resources, the acquire resource means including:

means to provide the acquiring user with at least one of the resources in the resource pool if the resource pool is not empty and there are no users on the resource queue, means for, where the resource pool is empty or the resource queue is non-empty, adding the acquiring user to the resource queue, having the acquiring user wait for notification on the synchronization flag, awakening the acquiring user when the resource pool is non-empty, determining if the acquiring user is at the head of the resource queue, and if the acquiring user is at the head of the resource queue, removing the acquiring user from the resource queue, removing at least one of the resources from the resource pool and returning said at least one of the resources to the acquiring user, otherwise, continuing to have the acquiring user wait for notification on the synchronization flag, means for the acquire resource means to return a time out exception if the acquiring user does not acquire at least one of the resources within a predefined time, each of the release resource means and the acquire resource means including synchronization means to constrain users such that only one user may execute either the release resource means or the acquire resource means at any one time, the said synchronization means being synchronized on the synchronization flag.

Advantages of the present invention include the ability to simply provide for priority access to resources in a programming environment, such as the Java environment.

BRIEF DESCRIPTION OF THE DRAWINGS

The preferred embodiment of the invention is shown in the drawings, wherein.

Figure 1:
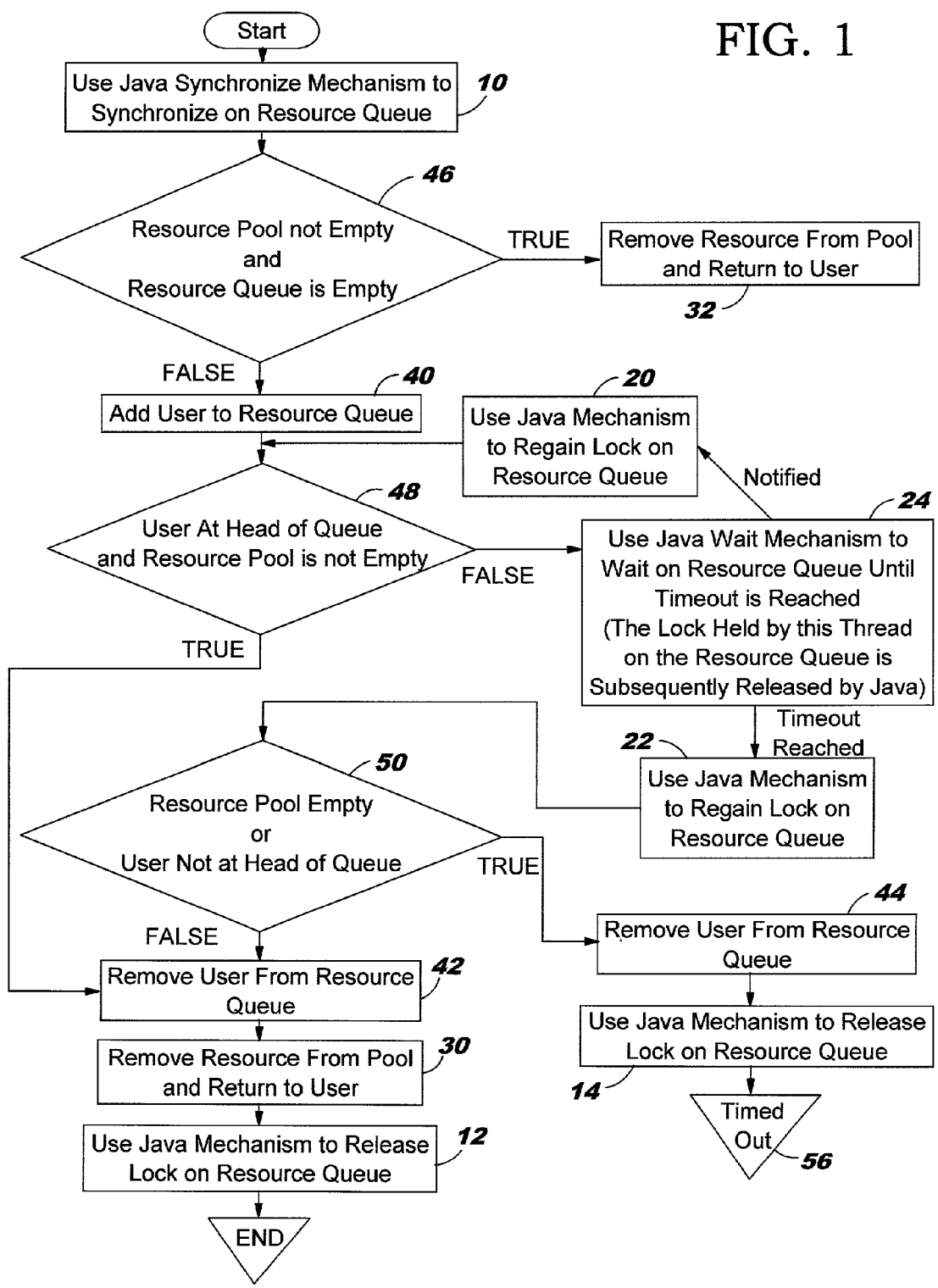
FIG. 1 is a flow chart showing the steps in a method to acquire a resource according to the preferred embodiment.

In the drawings, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The preferred embodiment is described in the Java programming language environment and relates to the resource allocation methods provided in Java. It will be understood by those skilled in the art that the preferred embodiment may be adapted to other programming language environments in which a resource allocation method analogous to that found in Java, is provided.

The resource allocation of the preferred embodiment is carried out by two methods: acquireResource( ), and freeResource(Object resource). The acquireResource( ) method relies on a helper method, resourceWait( ). The resource allocation of the preferred embodiment also includes a pool of available resources, a queue that contains the users waiting for ownership of a resource, and a value indicating how long each thread will continue to wait to obtain access to (ownership of) a resource.

Figure 2:
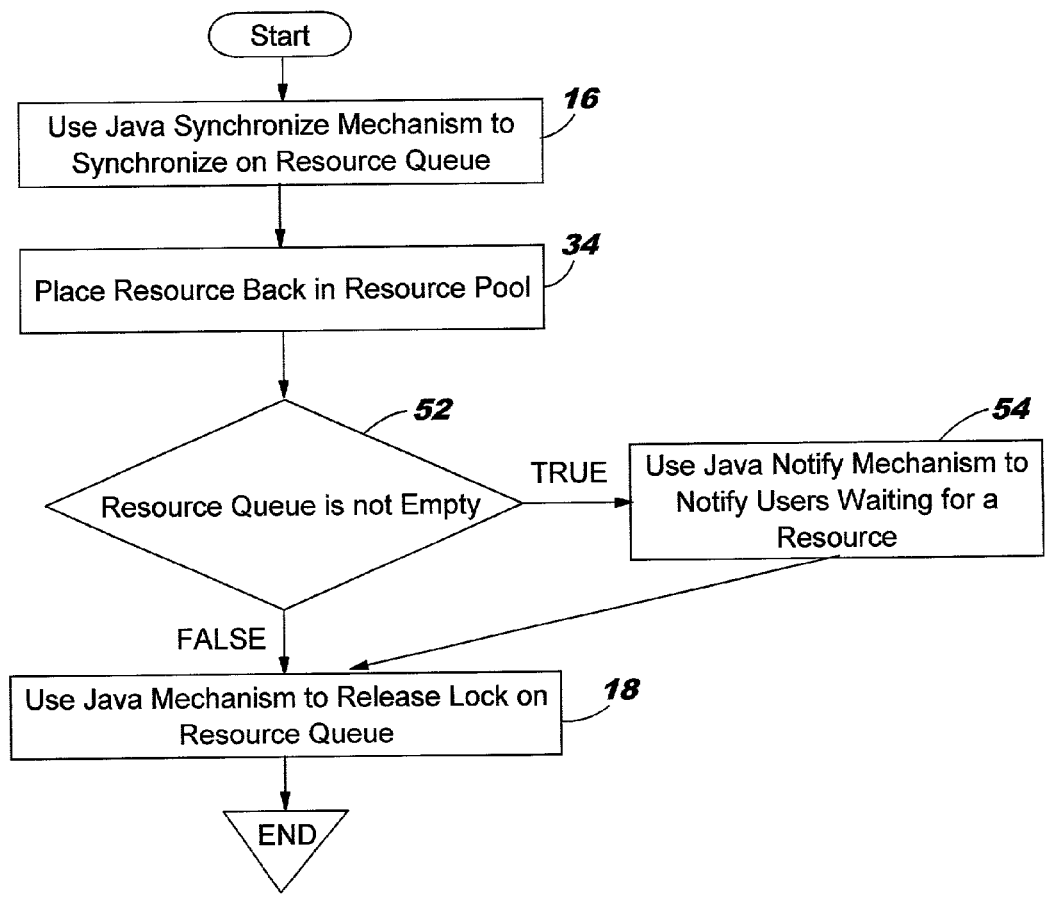
FIG. 2 is a flow chart illustrating a method to free up a resource according to the preferred embodiment.

Turning to the figures, FIG. 1 is a flowchart showing the steps in a method for acquiring a resource object, and FIG. 2 is a flowchart for a method for releasing a resource object. The methods of the preferred embodiment are synchronized such that a single process or thread is able to execute either of the methods at any one time. This synchronization is achieved by the steps shown in boxes 10, 12, 14, 20, 22 and 24 in FIG. 1 and boxes 16 and 18 in FIG. 2. The methods of the preferred embodiment add and remove resources to and from the resource pool, as shown in boxes 30 and 32, in FIG. 1 and box 34 in FIG. 2. The method for acquiring a resource object also utilizes the resource queue as shown in boxes 40, 42 and 44 in FIG. 1. Conditional branches in the methods evaluate the resource queue (and, in the acquire resource method, the resource pool) as is shown in conditional boxes 46, 48 and 50 in FIG. 1 and box 52 in FIG. 2.

With respect to the method to acquire a resource object set out in FIG. 1, box 10 shows the use of the Java synchronize mechanism to synchronize on the resource queue object. This synchronization step is important in providing that the acquired resource method and the free resource method are synchronized, not only with respect to different threads seeking access to each method, but also to ensure that there is synchronization between the two methods themselves. As will be understood by those skilled in the art, the object selected to provide the synchronization between the two methods may be any defined object. In the example of the preferred embodiment described, the resource queue object is selected. The two methods described each obtain and release locks on the resource queue object to ensure that only one thread will execute either of the two methods at any one time. As is set out below, the methods of the preferred embodiment require that the Java-standard wait and notify methods are also called on the resource queue object.

The locking mechanism provided by the Java synchronized method is shown at the beginning and end of the two methods: at boxes 10 (FIG. 1) and 16 (FIG. 2) for the beginning of the two methods and at boxes 12 and 14 (FIG. 1) and box 18 (FIG. 2) for the end of the methods. In addition, there is a lock release in box 24 (FIG. 1), while there is a wait on the requested resource. The lock is regained when the wait on the resource is ended, as shown in boxes 20, 22. Although these are shown expressly in the flowchart of FIG. 1, in the preferred embodiment, acquiring and releasing the lock is done as part of the Java-standard wait method.

The resource being requested by a user (thread or process) is found by querying a resource pool object. The initialization of the pool of resources is not shown. However, the placement of a resource into the resource pool is shown in FIG. 2, box 34. Resources are removed from the pool, for use by a thread, by the acquire resource method in one of two ways:

1. If there are resources in the pool and there is no queue of users (threads or processes) for the resource object the resource is returned to the user. With regard to FIG. 1, the condition is found in conditional box 46 and the step of removing the resource from the resource pool is found in box 32; and 2. If there are other users queuing for the resource, or there are no resources in the pool, the thread waits to reach the head of the queue or for a resource to be released. The removal of the resource from the resource pool in this case is shown in box 30. The conditional branching and steps preceding this return of the resource to the user are described in more detail below.

Resources are returned to the resource pool by the return resource method as shown in box 34 in FIG. 2.

The priority ordering of access to the resource object being requested is maintained by the resource queue object. Users (threads or processes) are placed on the resource queue when there is no available resource in the resource pool. Users are added to the resource queue at box 40 (FIG. 1). They are removed from the queue where the resource has been allocated to the user (see box 42) or where the resource is not allocated within the time defined by a specified maximum wait time variable (see box 44). The specified maximum wait time may be defined by the resource being requested, the nature of the user requesting the resource (some users are able to wait longer than others), or a combination of the two.

The Java Object.notifyAll( ) method is used to signal that a resource has been returned to the resource pool (by calling the release resource method). This is shown in FIG. 2, where if the resource queue is not empty (box 52), the Object.notifyAll( ) method is called (box 54). The effect of Object.notifyAll( ) is to awaken all threads that are waiting on the Object. In the preferred embodiment, the notifyAll method is called for the resource queue object.

FIG. 1 illustrates the steps that ensure that access to the resource object is carried out such that the longest-waiting thread obtains the resource object first. Where the resource pool is empty or the resource queue is not empty, and a user is requesting a resource object, the user is added to the resource queue (see FIG. 1 boxes 40, 46). The queue is then queried. If the user is at the head of the queue and the resource pool is not empty (box 48) then the user is removed from the resource queue (box 42), the resource is removed from the pool and returned to the user (box 30) and the lock on the resource queue is released (box 12).

If the user is either not at the head or the queue, or the resource pool is empty, then the method invokes the Java Object.wait( ) method. In the preferred embodiment, this causes the thread to wait on the resource queue object, the same object that the two methods are synchronized on. The wait will be terminated by the release resource method notifying all users that a resource has been placed back in the resource pool (box 54 in FIG. 2) or by a timeout condition being reached. In either case, for the thread to continue, it must regain the synchronization lock (on the resource queue, see FIG. 1, boxes 20 and 22). As referred to above, in the Java language, the Object.wait( ) method regains the lock on the Object (here the resource queue) before the thread will continue processing.

If the timeout condition has been reached, then a final condition is checked as shown in box 50. If the resource pool is empty or the user is not at the head of the queue then the user is removed from the resource queue (box 44) and the lock on the synchronization resource is released (box 14). The method returns a timed out result (box 56). If in the final condition of box 50, the resource pool is not empty, and the user is at the head of the queue, then the resource is allocated to the user as shown in boxes 42, 30 and 12.

Where the Java Object.wait( ) method is not timed out in box 24 but results in the thread being awakened by a notification, the conditional box 48 is reached to determine if the user is at the head of the queue (and that the resource pool is not empty). If the user is at the head of the resource queue then the resource is allocated to the user as shown in boxes 42, 30 and 12. Otherwise, the user must continue to wait on the resource object, as it carried out the steps shown in box 24.

As will be apparent, the use of the data objects set out above, in conjunction with the defined methods, will result in the threads placed on the resource queue first obtaining access to those resource objects before threads placed on the queue later. The methods set out in the flowcharts of FIGS. 1 and 2 are able to be simply coded in object oriented languages such as Java.

For example, example code for the request resource method is set out in Example 1, below.

```
private static Stack resourcePool = new Stack( );
private static Vector resourceQueue = new Vector( );
private static long timeout = 5000;
public final static Object acquireResource( ) throws Exception
{
synchronized(resourceQueue)
{
//If the pool is not empty and no other user is waiting for ownership, simply //return a
resource element to the user from the resource stack
if (!resourcePool.empty( )&& resourceQueue.isEmpty( ))
{
    Object obj = resourcePool.pop( );
    return obj;
}
else
{
    //if the pool is empty, then the user will have to wait for the resource
        //add thread(user) to the resource queue and wait
        resourceQueue.addElement (Thread.currentThread( ));
        resourceWait( );
    //If the thread comes alive and still not the first element in the list //(which means it
    is not this user's turn to obtain a resource)
    //then throw an exception telling the user that a resource element is not //available
```

-continued

```
        after waitingfor the entire timeout period.
        //If the thread comes alive and there is a resource element available and //the user is
        next in line to receive one then return the resource element //to the user.
            if (resourcePool.empty( )||
                    resourceQueue.firstElement( ) != Thread.currentThread( ))
            {
                //remove user from resource queue since no longer waiting
                    resourceQueue.removeElement (Thread.currentThread( ));
                    throw new Exception ("Resource Wait Time-out");
            }
            else
            {
                    Object obj = resourcePool.pop( );
                    //remove user from resource queue since no longer waiting
                    resourceQueue.removeElement (Thread.currentThread( ));
                    return obj;
            }
        }
    }
}
}
                                    Example 1
Continuing the same example, example code for the helper method is set out in Example 2,
                                      below.
    private final static void resourceWait( ) throws InterruptedException
    {
            //have thread wait for resource element until either
            //1. It times out.
            //2. The resource pool is no longer empty and it
            //is this thread's turn to receive a resource element.
            long expireTime = new System.currentTimeMillis( ) + timeout;
            for (long t = System.currentTimeMillis( );
                    t<expireTime;
                    t = new System.currentTimeMillis( ))
            {
            //It is this thread's turn to receive a resource
            //so return
            if (resourceQueue.firstElement( ) ==
            Thread.currentThread( ) && resourcePool.empty( ))
            {
                    break;
            }
            else
            {
            //Have users continue to wait their turn if they
            //are not at the head of the queue
        //continue to wait since still not this thread's turn
                    resourceQueue.wait(expireTime - t);
                    }
        }
    }
                                    Example 2
    Finally, example code for the free resource method is set out in Example 3, below.
public final static void freeResource(Object resource)
{
//Return if object given to free is null
if {resource == null) return;
//Ensure modifications to the queue and resource
//stack do not impede on each other
syychronized(resourceQueue)
{
    //put resource element back in pool
    resourcePool.push(resource);
    //If users are waiting to obtain a resource
    //element then notify the users
    if (resourceQueue.isEmpty( ))
    {
        //wake up all threads to ensure that no
        //one is left out
        resourceQueue.notifyAll( );
    }
}
}
```

EXAMPLE 3

As the Java programming language code in the above examples indicates, the invention provides a solution to the problem of accessing resources in a programming language environment which solution requires only a small number of easily coded methods and data objects to implement. The programming language extensions of the preferred embodiment may be provided in a library, interface, or other extension to a programming language, and the methods of the preferred embodiment are thus able to be utilized in a straightforward manner.

For example, where a class DBPool is defined to allocate database connections, and example statement seeking a connection is:

Connection conn=DBPool.acquireResource( );

A corresponding statement releasing the connection (and returning it to the resource pool) is:

DBPool.freeResource(conn);

In this manner the preferred embodiment is implemented to provide queuing for system resources in a programming language environment that ensures a fair allocation of those resources. Because the threads are placed on a queue, it is not possible for any given thread to be passed over when the resource repeatedly becomes free, as is possible when the resource allocation is based on the Java-provided methods of resource allocation, alone.

Although a preferred embodiment of the present invention has been described here in detail, it will be appreciated by those skilled in the art, that variations may be made thereto. For example, an object oriented programming language with similar resource allocation and synchronization methods may be used to implement the invention. Such variations may be made without departing from the spirit of the invention or the scope of the appended claims.

The invention claimed is:

1. A computer implemented language extension to an object oriented programming language for the allocation of resource objects to users in a programming environment, the language extension comprising:
    a resource pool for storing a plurality of individual available resource objects;
    a resource queue for storing data representing select ones of the users, the users on the resource queue seeking the allocation of the resource objects;
    a release resource system for releasing a concluded resource object after use by a user, comprising:
        means for returning the concluded resource object to the resource pool; and
        means for, when the resource queue is not empty, using an object oriented programming language notify method to notify the users waiting on a synchronization object that the concluded resource object is available;
    an acquire resource system for an acquiring user to acquire at least one of the resource objects, comprising:
        means for returning at least one of the resource objects in the resource pool if the resource pool is not empty and there are no users on the resource queue;
        when the resource pool is empty or the resource queue is non-empty:
            means for adding the acquiring user to the resource queue;
            means for having the acquiring user wait for notification by using the object oriented programming language wait method on the synchronized object;
            means for awakening the acquiring user wait for notification by using the object oriented programming language wait method on the synchronized object;
            means for awakening the acquiring user when there is a resource object in the resource pool;
            means for determining if the acquiring user is at the head of the resource queue, and if the acquiring user is at the head of the resource queue:
                means for removing the acquiring user from the resource queue;
                means for removing at least one of the resource objects from the resource pool; and
                means for returning said at least one of the resource objects to the acquiring user, otherwise, continuing to have the acquiring user wait for notification by using the object oriented programming language wait method on the synchronized object; and
        means for the acquire resource system to remove the acquiring user from the resource queue if the acquiring user does not acquire said at least one of the resource objects within a predefined time; and
    synchronization means to constrain users with regard to a plurality of individual available resource objects such that only one user may execute either the release resource system or the acquire resource system at any one time, said synchronization means being synchronized on the synchronization object.

2. The language extension of claim 1, in which the synchronization object is the resource queue.

3. The language extension of claim 2, in which the programming language is Java.

4. The language extension of claim 3 in which the acquire resource system comprises a helper means to wait for the acquiring user to be at the head of the resource queue and the resource pool to be non-empty.

5. A computer implemented method for allocating resource objects to users in a programming language environment, the programming language environment comprising a resource pool for storing a plurality of individual available resource objects, and a resource queue for storing data representing select ones of the users seeking allocation of the resource objects, the method comprising the steps of:
    a. releasing a concluded resource object after use by a user, comprising the steps of:
        i. returning the concluded resource object to the resource pool; and
        ii. when the resource queue is not empty, using an object oriented programming language notify method to notify users waiting on a synchronization object that the concluded resource object is available,
    b. permitting an acquiring user to acquire at least one of the resource objects, comprising the steps of:
        i. returning to the acquiring user at least one of the resource objects in the resource pool if the resource pool is not empty and the are no users on the resource queue;
        ii. where the resource pool is empty or the resource queue is non-empty, adding the acquiring user to the resource queue, having the acquiring user wait for notification by using the object oriented programming language wait method on the synchronized object, awakening the acquiring user when there is a resource object in the resource pool, determining if the acquiring user is at the head of the resource queue, and if the acquiring user is at the head of the resource queue, removing the acquiring user from the resource queue, removing at least one of the resource objects from the resource pool, and returning said at least one of the resource objects to the acquiring user, otherwise, continuing to have the acquiring user wait for notification by using the object oriented programming language wait method on the synchronized object; and iii. removing the acquiring user from the resource queue if the acquiring user does not acquire at least one of the resource objects within a predefined time; and c. synchronizing each of the above steps to constrain users such that only one user with regard to a plurality of individual available resource objects may execute either the above steps (a) and (b) at any one time, said synchronization being carried out on the synchronization object.

6. A program storage device readable by a machine, tangibly embodying a program of instructions executable by the machine to perform the method steps of claim 5.

7. A program storage device readable by a machine, tangibly embodying instructions executable by the machine to provide a programming language extension to an object oriented programming language for the allocation of resource objects to users in a programming environment, the extension comprising:

a resource pool for storing a plurality of individual available resource objects;

a resource queue for storing data representing select ones of the users seeking allocation of the resource objects;

a release resource system for releasing a concluded resource object after use by a user, the release resource method comprising:

means for returning the concluded resource object to the resource pool;

means for, when the resource queue is not empty, using an object oriented programming language notify method to notify the users waiting on a synchronization object that the concluded resource object is available;

an acquire resource system for an acquiring user to acquire at least one of the resource objects, comprising:

means for returning at least one of the resource objects iii the resource pool if the resource pool is not empty and there are no users on the resource queue;

when the resource pool is empty of the resource queue is non-empty:

means far adding the acquiring user to the resource queue;

means for having the acquiring user wait for notification by using the object oriented programming language wait method on the synchronized object;

means for awakening the acquiring user when there is a resource object in the resource pool;

means for determining if the acquiring user is a the head of the resource queue, and if the acquiring user is ate head of the resource queue:

means for removing the acquiring user from the resource queue;

means for removing at least one of the resource objects from the resource pool; and means for returning said one of the resource object to the acquiring user, otherwise, continuing to have the acquiring user wait for notification by using the object oriented programming language wait method on the synchronized object; and means for the acquire resource system to remove the acquiring user from the resource queue if the acquiring user does not acquire at least one of the resource objects within a predefined time; and synchronization means to constrain users with regard to a plurality of individual available resource objects such that only one user may execute either the release resource system or the acquire resource method at any one time, said synchronization means being synchronized on the synchronization object.

8. The program storage device of claim 7, in which the synchronization object is the resource queue.

9. The program storage device of claim 8, in which the programming language is Java.

10. The program storage device of claim 9, in which the acquire resource system comprises a helper means to wait for the acquiring user to be at the head of the resource queue and the resource pool to be non-empty.

11. A computer program product for use with a computer supporting the Java programming language environment, the computer program product comprising a Java class for the allocation of resource objects to threads in a programming environment, the class comprising:

a resource pool for storing a plurality of individual available resource objects;

a resource queue for storing data representing select ones of the threads, the threads on the resource queue seeking the allocation of the resource objects;

a release resource system for releasing a concluded resource object after use by a thread, the release resource system comprising:

means for returning the concluded resource object to the resource pool;

when the resource queue is not empty, means for notifying the threads waiting on a synchronization object that the concluded resource object is available;

an acquire resource system for an acquiring thread to acquire at least one of the resource objects, the acquire resource system comprising:

means for returning at least one of the resource objects in the resource pool if the resource pool is not empty and there are no threads on the resource queue;

when the resource pool is empty or the resource queue is non-empty:

means for adding the acquiring thread to the resource queue;

means for invoking the Java wait method on the synchronized object;

when the acquiring thread is awakened and there is a resource object in the resource pool, means for determining if the acquiring thread is at the head of the resource queue, and if the acquiring tread is at the head of the resource queue:

means for removing the acquiring tread from the resource queue;

means for removing at least one of the resource objects from the resource pool; and means for returning said at least one of the resource objects to the acquiring user, otherwise, invoking the Java wait method on the synchronized object; and means for removing the acquiring thread from the resource queue if the acquiring thread does not acquire at least one of the resource object within a predefined time; and means for using the Java synchronized method to constrain threads with regard to a plurality of individual available resource objects such that only one thread may execute either the release resource system or the acquire resource system at any one dine, said Java synchronized method being synchronized on the synchronization object.

12. The computer program product of claim 11 in which the synchronization object is the resource queue.

13. The computer program product of claim 12, in which the acquire resource system comprises helper means to wait for the acquiring user to be at the head of the resource queue and the resource pool to be non-empty.

14. A computer implemented language extension to a programming language for the allocation of resources to users in a programming environment, the language extension comprising:
  a resource pool for storing a plurality of individual available resources;
  a resource queue for storing data representing select ones of the users seeking allocation of the resource objects;
  a release resource means for releasing a concluded resource after use by a user, the release resource means comprising:
    means for returning the concluded resource to the resource pool; and
    means for, when the resource queue is not empty, notifying the user waiting on a predefined synchronization flag that the concluded resource is available;
  an acquire resource means for an acquiring user to acquire at least one of the resources, the acquire resource means comprising:
    means for providing the acquiring user with at least one of the resources in the, resource pool if the resource pool is not empty and there are no users on the resource queue;
    when the resource pool is empty or the resource queue is non-empty:
      means for adding the acquiring user to the resource queue;
    means for having the acquiring user wait for notification on the synchronization flag;
    means for awakening the acquiring user when the resource pool is non-empty, and means for determining if the acquiring user is at the head of the resource queue; and if the acquiring user is at the head of the resource queue:
      means for removing the acquiring user from the resource queue;
      means for removing at least one of the resources from the resource pool; and
      means for returning said at least one of the resources to the acquiring user, otherwise, continuing to have the acquiring user wait for notification on the synchronization flag; and
    means for the acquire resource means remove the acquiring user from the resource queue if the acquiring user does not acquire at least one of the resources within a predefined time; and
  synchronization means to constrain users with regard to a plurality of individual available resource objects such that only one user may execute either the release resource means of the acquire resource means at any one time, said synchronization means being synchronized on the synchronization flag.

* * * * *

UNITED STATES PATENT AND TRADEMARK OFFICE
CERTIFICATE OF CORRECTION

PATENT NO. : 7,007,277 B2
DATED : February 28, 2006
INVENTOR(S) : Hildebrand et al.

It is certified that error appears in the above-identified patent and that said Letters Patent is hereby corrected as shown below:

Column 13,
Line 35, remove "iii" and insert -- in --.

Column 14,
Line 48, remove "tread" and insert -- thread --.

Signed and Sealed this

Thirtieth Day of May, 2006

JON W. DUDAS
*Director of the United States Patent and Trademark Office*